US 6,713,191 B2

(12) United States Patent
Feikus et al.

(10) Patent No.: US 6,713,191 B2
(45) Date of Patent: Mar. 30, 2004

(54) SURFACE-ALLOYED CYLINDRICAL, PARTIALLY CYLINDRICAL OR HOLLOW CYLINDRICAL COMPONENT

(75) Inventors: Josef Franz Feikus, Bonn (DE); Alexander Fischer, Swissttal (DE)

(73) Assignee: VAW aluminium AG, Bonn (DE)

( * ) Notice: Subject to any disclaimer, the term of this patent is extended or adjusted under 35 U.S.C. 154(b) by 0 days.

(21) Appl. No.: 10/019,974
(22) PCT Filed: Feb. 21, 2001
(86) PCT No.: PCT/EP01/01936
§ 371 (c)(1), (2), (4) Date: May 22, 2002
(87) PCT Pub. No.: WO01/65135
PCT Pub. Date: Sep. 7, 2001

(65) Prior Publication Data
US 2002/0164497 A1 Nov. 7, 2002

(30) Foreign Application Priority Data
Feb. 28, 2000 (DE) .......................... 100 09 250

(51) Int. Cl.⁷ .................. B32B 15/04; B32B 15/20; B32B 15/01; B32B 15/02
(52) U.S. Cl. ............... 428/654; 428/650; 428/621; 428/641; 428/217; 428/220; 428/213; 428/34.1; 148/437
(58) Field of Search ............... 428/654, 610, 428/650, 621, 622, 627, 628, 636, 637, 641, 649, 686, 687, 212, 217, 220, 213, 332, 34.1, 539.5; 148/437, 438, 439, 440

(56) References Cited

U.S. PATENT DOCUMENTS

| 4,068,645 A | * | 1/1978 | Jenkinson ............... 123/193 C |
| 5,612,110 A | | 3/1997 | Watremez ............... 428/66.2 |
| 6,096,143 A | * | 8/2000 | Ruckert et al. ........... 148/439 |
| 6,303,897 B1 | * | 10/2001 | Bady et al. ........... 219/121.65 |
| 2001/0003227 A1 | * | 6/2001 | Feikus .................. 29/888.06 |

FOREIGN PATENT DOCUMENTS

| CH | 686 187 | 1/1996 |
| DE | 39 22 378 A1 | 1/1991 |
| DE | 196 43 029 | 4/1998 |
| DE | 19817091 A | 10/1999 |
| EP | 0987464 A | 3/2000 |

\* cited by examiner

Primary Examiner—Michael La Villa
(74) Attorney, Agent, or Firm—Proskauer Rose LLP

(57) ABSTRACT

A surface-alloyed cylindrical, partly cylindrical or hollow cylindrical component consists of an aluminium matrix casting alloy (1) and a precipitation area (3) extending as far as the surface of the component (3) and consisting of an aluminium base alloy with precipitated hard phases. A eutectic area (2) (hereafter: "transition area") which is supersaturated by primary hard phases is present between the matrix (1) and the precipitation area (3) and the increase in hardness from the matrix (1) to the component surface (3) is gradual.

7 Claims, 2 Drawing Sheets

SURFACE-ALLOYED CYLINDRICAL, PARTIALLY CYLINDRICAL OR HOLLOW CYLINDRICAL COMPONENT

BACKGROUND OF THE INVENTION

The invention relates to a surface-alloyed cylindrical, partly cylindrical or hollow cylindrical structural member, consisting of an aluminium matrix casting alloy and a precipitation zone extending as far as the surface of the structural member, comprising an aluminium based alloy with precipitated hard phases.

A method for coating inner bearing surfaces of cylinder walls is disclosed in DE-OS 198 17 091. According to claim 1 of the Offenlegungsschrift, wear-resistant surfaces are produced on the inner piston bearing surfaces of light metal engine blocks by using a probe for the continuous supply of silicon powder in which an energy beam with a radiation spot travelling spirally over the surface is moved relative to the light metal engine block held in a fixed position. At a laser light power of approximately 2 kW and a radiation spot diameter of approximately 0.5 to 2 mm approximately 10 g of powder per minute is applied to the surface and alloyed. By this means a hard material component of 20 to 50% can be alloyed into the surface at a penetration depth of approximately 1 mm.

Attempts were also made to develop a method for manufacturing a light metal cylinder block in which a laser beam having a strip width of at least 2 mm transverse to the feed direction is guided over the light metal matrix surface held in a fixed position. In this case the powder is first heated to the melting point at the point of incidence of the laser beam on the light metal matrix surface and then diffuses therein. Primary silicon is formed in the alloying zone where an average layer thickness of 150 to 650 μm is given as preferred in the matrix alloy. The laser light power is preferably 3 to 4 kW where linear focussing systems can also be used.

The structure attainable by the afore-mentioned method consists of a light metal matrix alloy with a finely disperse surface layer containing primary silicon precipitations which exhibits rounded grains having an average grain diameter between 1 and 10 μm. In addition to the pure aluminium phase, the surface layer also contains 10 to 14% AlSi eutectic and 5 to 20% primary silicon where the minimum hardness is approximately 160 HV.

Structural members insensitive to thermal shock are required for specific applications. This can only be achieved using methods of manufacture known so far by using very expensive treatment measures. A characteristic feature for these heavy-duty structural members is a slow increase in hardness from the matrix as far as the surface layer where the total increase in hardness should extend over a range of 200% relative to the initial hardness of the matrix alloy.

SUMMARY OF THE INVENTION

The object of the present invention is to develop tribologically optimised, heat-treatable cylinder blanks having new micro-structural properties and near-surface material changes. The new micro-structural properties and near-surface material changes should in particular make it possible to use the casting blank as structural members exposed to vibrations, such as, for example, bearing surfaces of bearing boxes of reciprocating machines, wear surfaces of brake parts, and sliding and friction surfaces of all types.

This object is solved according to the invention by the features specified in the claims. Using the structure according to the invention comprising matrix, precipitation zone and an eutectic transition zone supersaturated by primary hard phases, it is possible to manufacture various structural members having wear surfaces such as, for example, sliding surfaces (crankshaft bearings), friction surfaces (brake discs) as well as engine blocks and cylinder heads, including the valve seat rings located therein, having especially favourable properties. The properties are characterised by a slow increase in hardness from the matrix as far as the surface layer. These properties predestine structural members thus equipped for applications where structural members insensitive to thermal shock are required.

Different types of alloys can be used in a coating layer. The powder can be applied to the surface of the workpiece in a single stage (single powder irradiation) or in several stages (several powder irradiations) via suitably shaped powder slit nozzles. The linear focal width is at least 4 mm, preferably 5 to 15 mm.

The alloys AlSi and AlSiCu as well as AlSiCuNi and Mg-containing Al alloys are suitable as the workpiece for single-stage powder supply where silicon is fed in the powder jet. For a two-stage powder supply lead as well as silicon could also be applied as powder material to an aluminium-silicon casting blank.

BRIEF DESCRIPTION OF DRAWINGS

The invention is explained in greater detail subsequently with reference to two examples of embodiment using silicon as hard material powder. The drawings are as follows.

DETAILED DESCRIPTION OF THE INVENTION

Figure 1:
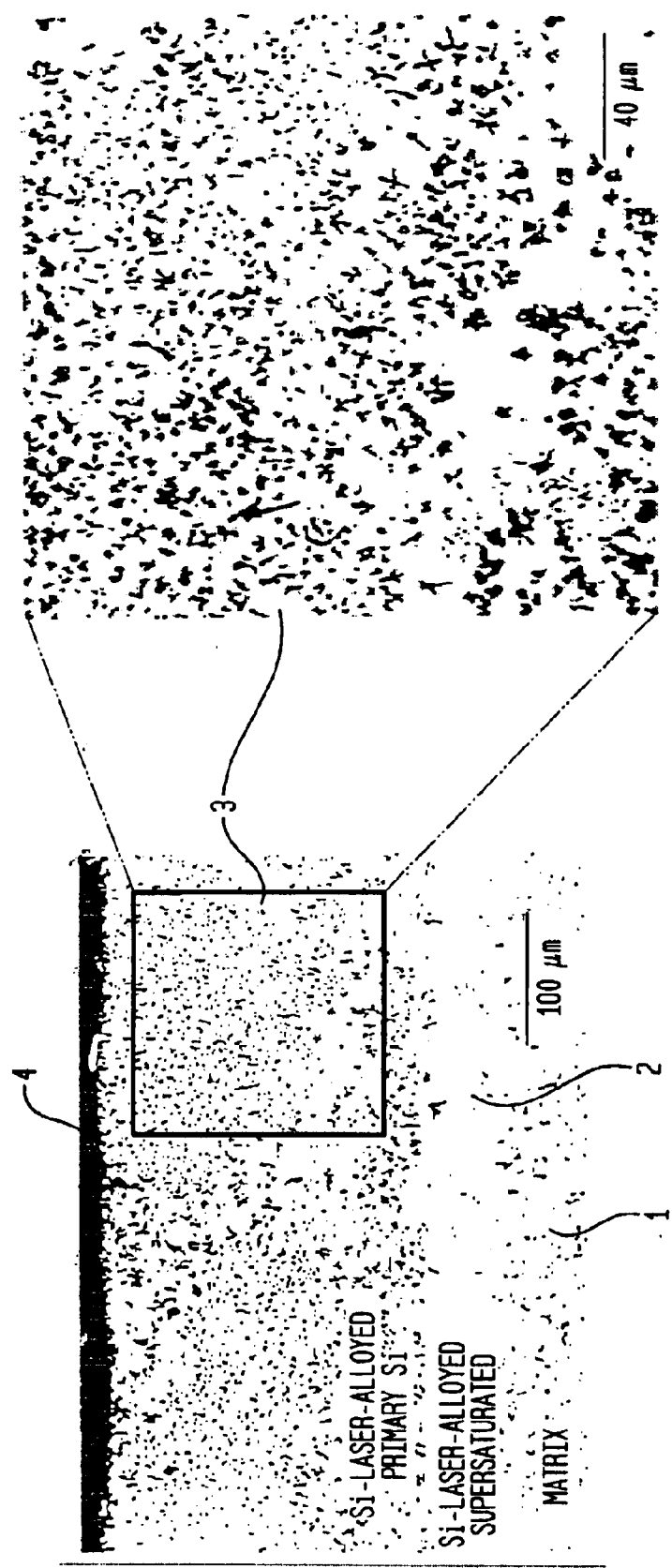
FIG. 1 Cross-section through a surface-alloyed structural member with three zones constructed according to the invention.

FIG. 1 shows a cross-section of a structural member manufactured according to the invention with an aluminium matrix 1, a transition zone 2 and a precipitation zone 3. In the precipitation zone 3 many fine particles of hard material result in an especially hard surface with HV>250. The surface 4 of the structural member can, for example, form the bearing surface for pistons, shafts or bearing parts and has been brought into a state ready for use by purely mechanical treatment.

In the transition zone 2 there is a homogeneous supersaturated aluminium-silicon casting structure which shows a uniform grey colour. The heat influx of the energy beam directed onto the surface reaches as far as this and forms a melting front.

The heat supplied into the structural member during the surface alloying is removed via the matrix 1. The heat balance can be influenced by feed rates, by energy control and by cooling measures.

Figure 2:
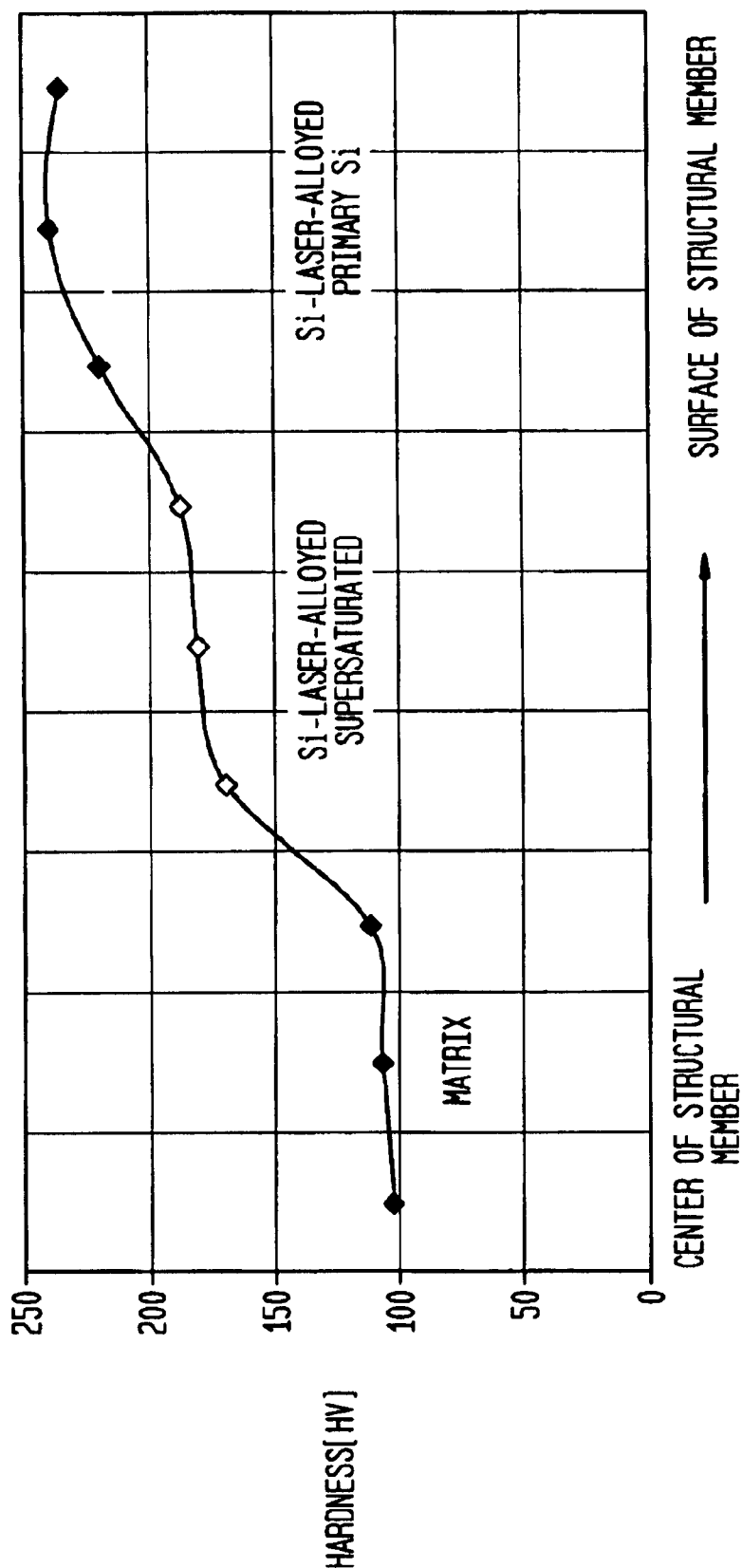
FIG. 2 Hardness profile along the Y co-ordinate in FIG. 1.

FIG. 2 shows the hardness profile of a structural member manufactured according to the invention in the region of the surface of the structural member. In the present case the hardness begins at 100 HV in the matrix and increases stepwise to the maximum value of 240 HV. Improved thermal shock behaviour is associated with this hardness profile.

A harder phase region of Si-alloyed primary silicon is cushioned on a more elastic softer matrix alloy.

A method for manufacturing a surface-alloyed cylindrical or partly cylindrical structural member involves first directing an energy beam having a linear radiation area (also called linear focus) onto a workpiece surface. The workpiece surface is thereby melted and a hard material or an alloy powder is fed into the molten surface.

In the zone of incidence of the energy beam there forms a locally bounded melting bath with a heating and melting front, a solution zone or remelting zone and a solidification front.

The powder supplied to the workpiece surface is melted in the heating front and immersed in the melting bath. Tests have shown that at a wavelength of 780 to 940 nm the energy beam coupling-in is optimised so that the powder is heated rapidly and diffuses into the melting bath in contact with the liquefied matrix alloy.

Convection takes place in the solution zone so that the homogenisation process in the melting zone is accelerated. This is made possible by the energy beam having a specific power of at least $10^5$ W/cm$^2$. It can be seen from polished sections that the hard material or alloy powder in the melting bath is only uniformly distributed if the linear focus has acted for a sufficiently long time on the solution zone. The precise values can be determined experimentally.

In the solidification zone the uniformly distributed powder material is then subjected to a directional solidification at a cooling rate of 200 to 600 K/sec in the solidification front where the feed rate is between 500 and 5000 mm/min. In an advantageous variant the powder is transferred to the surface of the structural member in the gas stream so that a certain quantity of powder can already penetrate into the melting zone by means of the kinetic energy.

Further tests have shown that the energy beam is preferably split before the zone of incidence where a first part beam is deflected into the heating and melting zone and a second part beam is deflected behind the solidification front for thermal structural treatment. The formation of the structure can be specifically controlled by means of this method.

Further control of the micro-structure can be achieved by directing the energy beam in the solidification front at a specific power of <1 kW/cm$^2$ intermittently onto the surface of the workpiece. It has been found that the time of action of the energy beam in the melting bath for dissolving and homogeneously distributing the hard material or intermetallic phases lies between 0.02 and 1 second.

Said requirements are met by a >3 kW diode laser having an adjustable linear focal width. By this means before the beginning and at the end of a coating the linear focal width of the energy beam can be reduced transverse to the feed direction. The quantity of powder can also be controlled similarly so that during a surface treatment only small overlaps of the supplied quantity of powder or the incident energy were established.

If the workpiece is constructed as a hollow cylinder, it should preferably rotate about the energy beam in the downhand position so that the energy beam which is held in a fixed position relative to the direction of rotation, achieves a continuous direction of feed during the rotation in the direction of the axis of rotation to produce a flat alloying zone.

Surface-alloyed cylindrical, partly cylindrical or hollow cylindrical structural members can be manufactured using the invention. They consist of an aluminum matrix casting alloy and a precipitation zone extending as far as the surface of the structural member, comprising an aluminum base alloy with precipitated hard phase. Between the matrix and precipitation there is a eutectic zone supersaturated by primary hard phases (supersaturated zone) where the hardness increases stepwise from the matrix to the surface of the structural member. Especially favorable conditions can be achieved if the matrix alloy is of the hypoeutectic type AlSiCu and in the supersaturated eutectic transition zone there is an alloy of the type AlSi with finely precipitated primary silicon phases smaller than 1 $\mu$whereas in the precipitation zone there use primary silicon phases of 2 to 20 $\mu$m. Then, increases in hardness as far as the surface of the structural member of at least 200% can be achieved.

The layer thickness ratio in a structural member according to the invention is more than 2:1 between the precipitation zone and the transition zone, measured from the surface of the structural member in the direction of the aluminium matrix. Here increases in hardness between the matrix and the surface of the structural member in the region of 1:1.5:2 to 1:2:3 can be achieved.

What is claimed is:

1. A surface-alloy cylindrical, partly cylindrical or hollow cylindrical structural comprising:

an aluminum matrix; and a precipitation zone including an aluminum based alloy with precipitated hard phases, said precipitation zone extending as far as the surface of the structural member, wherein between the matrix and the preciptation zone there is an euctectic transition zone supersaturated by primary hard phases, and wherein the hardness increases stepwise from the matrix to the surface of the structural member on the preciptation zone.

2. A structural member according to claim 1, wherein the matrix is an hypoeutectic AlSiCu or AlSiMg alloy, the eutectic transition zone is an AlSi alloy with finely precipitated primary silicon phases <1 $\mu$m, and the precipitation zone includes primary silicon phases of 2–20 $\mu$m, and wherein the hardness on the surface of the structural member is increased to at least 200% of the hardness of the matrix.

3. Brake parts having sliding and friction surfaces made with the structural member of claim 1, wherein the precipitation zone further comprises:

a pure aluminum phase;

between 10 to 14% eutectic AlSi; and between 5 to 20% primary silicon.

4. Structural devices exposed to vibrations made with the structural member of claim 1, wherein hard materials having a hardness between 160 to 240 HV are embedded on the surface of the structural member.

5. The structural devices of claim 4, wherein the hard materials comprise primary silicon.

6. A structural member according to claim 1, wherein the layer thickness ratio of the precipitation zone, measured from the surface of the structural member, to the transition zone is greater than 2:1.

7. A structural member according to claim 1, wherein the hardness ratio between the aluminum matrix, the eutectic transition zone and the precipitation zone is between 1:1.5:2 to 1:2:3 and wherein the hardness at the surface of the structural member lies above 200 HV.

* * * * *